US012783033B2

(12) United States Patent
Lee et al.

(10) Patent No.: US 12,783,033 B2
(45) Date of Patent: Nov. 3, 2026

(54) SYSTEM ON CHIP FOR SUPPLYING A VOLTAGE

(71) Applicant: SAMSUNG ELECTRONICS CO., LTD., Suwon-si (KR)

(72) Inventors: Jaegon Lee, Seongnam-si (KR); Yohan Kwon, Seoul (KR); Sangho Kim, Suwon-si (KR); Seki Kim, Suwon-si (KR); Joonseok Kim, Seoul (KR); Yooseok Shon, Seoul (KR); Dooseok Yoon, Suwon-si (KR); Iksu Lee, Yongin-si (KR); Jongpil Lee, Suwon-si (KR); Hyongmin Lee, Seoul (KR); Wookyeong Jeong, Seongnam-si (KR)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 126 days.

(21) Appl. No.: 18/584,309

(22) Filed: Feb. 22, 2024

(65) Prior Publication Data

US 2024/0192752 A1 Jun. 13, 2024

Related U.S. Application Data

(63) Continuation of application No. 17/559,684, filed on Dec. 22, 2021, now Pat. No. 11,947,401.

(30) Foreign Application Priority Data

Feb. 9, 2021 (KR) ........................ 10-2021-0018539
Jun. 21, 2021 (KR) ........................ 10-2021-0080437

(51) Int. Cl.
*G06F 1/28* (2006.01)
*G05F 1/59* (2006.01)
*H02M 3/157* (2006.01)

(52) U.S. Cl.
CPC .................. *G06F 1/28* (2013.01); *G05F 1/59* (2013.01); *H02M 3/157* (2013.01)

(58) Field of Classification Search
CPC ............. G06F 1/28; G06F 1/59; H02M 3/157
See application file for complete search history.

(56) References Cited

U.S. PATENT DOCUMENTS

| | | | | |
|---|---|---|---|---|
| 7,299,370 | B2 * | 11/2007 | George | G06F 1/3203 713/340 |
| 8,416,013 | B1 | 4/2013 | Sonkar et al. | |
| 9,450,580 | B2 * | 9/2016 | Lundberg | H03K 19/0008 |
| 9,618,956 | B2 | 4/2017 | Gill et al. | |

(Continued)

OTHER PUBLICATIONS

Communication issued on Mar. 10, 2026 by the Korean Ministry of Intellectual Property (MOIP) in Korean Patent Application No. 10-2021-0080437.

(Continued)

*Primary Examiner* — Hyun Soo Kim
(74) *Attorney, Agent, or Firm* — Sughrue Mion, PLLC

(57) ABSTRACT

A system on chip includes a core having a clock gating state in which supplying a clock signal is suspended; and a power manager generating a supply voltage based on an external supply voltage and providing the supply voltage to the core. the power manager increases the supply voltage every time the supply voltage is lower than a target voltage for maintaining the clock gating state. The target voltage is lower than the external supply voltage.

20 Claims, 13 Drawing Sheets

(56) References Cited

U.S. PATENT DOCUMENTS

| | | | | |
|---|---|---|---|---|
| 9,766,678 | B2 | 9/2017 | Muthukaruppan et al. | |
| 9,852,859 | B2 | 12/2017 | Cao et al. | |
| 10,528,117 | B2 | 1/2020 | Gupta et al. | |
| 10,664,006 | B2 | 5/2020 | Rangarajan et al. | |
| 2008/0276026 | A1* | 11/2008 | Branover | G06F 1/3203 710/260 |
| 2011/0080798 | A1* | 4/2011 | Liu | G11C 5/147 365/228 |
| 2012/0102344 | A1* | 4/2012 | Kocev | G06F 1/3287 713/322 |
| 2013/0328533 | A1 | 12/2013 | Idgunji et al. | |
| 2014/0015505 | A1* | 1/2014 | George-Kelso | G05F 1/46 323/285 |
| 2014/0095896 | A1* | 4/2014 | Carter | G06F 1/26 713/300 |
| 2014/0344589 | A1 | 11/2014 | Muthukaruppan et al. | |
| 2015/0082070 | A1 | 3/2015 | Bose et al. | |
| 2016/0342167 | A1 | 11/2016 | Zhou et al. | |
| 2017/0083033 | A1 | 3/2017 | Park et al. | |
| 2019/0065359 | A1* | 2/2019 | Rangarajan | G06F 11/3656 |
| 2020/0073468 | A1 | 3/2020 | Gupta et al. | |
| 2020/0103956 | A1* | 4/2020 | Srinivas | G06F 3/0683 |
| 2020/0333873 | A1 | 10/2020 | El Sherif et al. | |

OTHER PUBLICATIONS

Office Action dated Jan. 13, 2026, issued by Korean Patent Office in Korean Patent Application No. 10-2021-0080437.

* cited by examiner

FIG. 5

| Δ | Tr_11~Tr_1n | Tr_21~Tr_2m (m=2n) | Tr_31~Tr_3i (i=2m) | Tr_41~Tr_4j (j=2i) |
|---|---|---|---|---|
| 0 | OFF | OFF | OFF | ON |
| α | ON | OFF | OFF | ON |
| 2α | OFF | ON | OFF | ON |
| 3α | ON | ON | OFF | ON |
| 4α | OFF | OFF | ON | ON |
| 5α | ON | OFF | ON | ON |
| 6α | OFF | ON | ON | ON |
| 7α | ON | ON | ON | ON |

SYSTEM ON CHIP FOR SUPPLYING A VOLTAGE

CROSS-REFERENCE TO RELATED APPLICATIONS

This application is Continuation of U.S. application Ser. No. 17/559,684 filed Dec. 22, 2021, which is based on and claims priority under 35 U.S.C. § 119 to Korean Patent Application Nos. 10-2021-0018539, filed on Feb. 9, 2021, and 10-2021-0080437, filed on Jun. 21, 2021, in the Korean Intellectual Property Office, the disclosures of which are incorporated by reference herein in their entireties.

BACKGROUND

The disclosure relates to an electronic device, and more particularly, to a system on chip.

Various embodiments relate to an electronic device and a method for maintaining the stability of each internal power source of a system on chip (SoC) included in the electronic device, and particularly, may prevent the occurrence of an unstable power state of an electronic device by monitoring a state of each internal driving power of the electronic device configured in an SoC form and controlling a stability-related parameter.

SUMMARY

The disclosure provides a system on chip (SoC) for supplying, to a core in a clock gating state, a minimum supply voltage for maintaining the clock gating state.

In accordance with an aspect of the disclosure, a system on chip (SoC) for receiving an external supply voltage includes a first core configured to receive a first supply voltage through a first power rail and perform an operation in response to a first clock signal; and a power manager configured to manage the first supply voltage, wherein the power manager includes a plurality of header switch circuits configured to connect, in response to a plurality of control signals, the first power rail to a second power rail through which the external supply voltage is supplied; and a voltage regulator configured to compare the first supply voltage with a target voltage in a state in which supplying the first clock signal to the first core is suspended, and generate the plurality of control signals based on a comparison result.

In accordance with an aspect of the disclosure, a system on chip (SoC) for receiving an external supply voltage includes a core configured to maintain a clock gating state in which supplying a clock signal from an outside is suspended; a plurality of header switch circuits configured to deliver a supply voltage, which is reduced from the external supply voltage, to the core in response to a plurality of control signals; and a voltage regulator configured to: monitor the supply voltage; change logic levels of the plurality of control signals according to a difference level equal to a difference between the supply voltage and a target voltage; and output the plurality of control signals, the logic levels of which have been changed, to the plurality of header switch circuits.

In accordance with an aspect of the disclosure, a system on chip (SoC) for receiving an external supply voltage includes a core having a clock gating state in which supplying a clock signal from the outside is suspended; and a power manager configured to generate a supply voltage based on the external supply voltage and provide the supply voltage to the core, wherein the power manager is further configured to increase the supply voltage every time the supply voltage is lower than a target voltage for maintaining the clock gating state, and wherein the target voltage is lower than the external supply voltage.

In accordance with an aspect of the disclosure, a system on chip (SoC) includes a core; and a plurality of header switch circuits configured to supply a supply voltage to the core, wherein each of the plurality of header switch circuits is turned on or off based on a detected supply voltage supplied to the core.

BRIEF DESCRIPTION OF THE DRAWINGS

Embodiments of the disclosure will be more clearly understood from the following detailed description taken in conjunction with the accompanying drawings in which:

FIG. 5 is a table of logic levels of a plurality of control signals varying with a difference level, according to an embodiment;

DETAILED DESCRIPTION OF THE EMBODIMENTS

Figure 1:
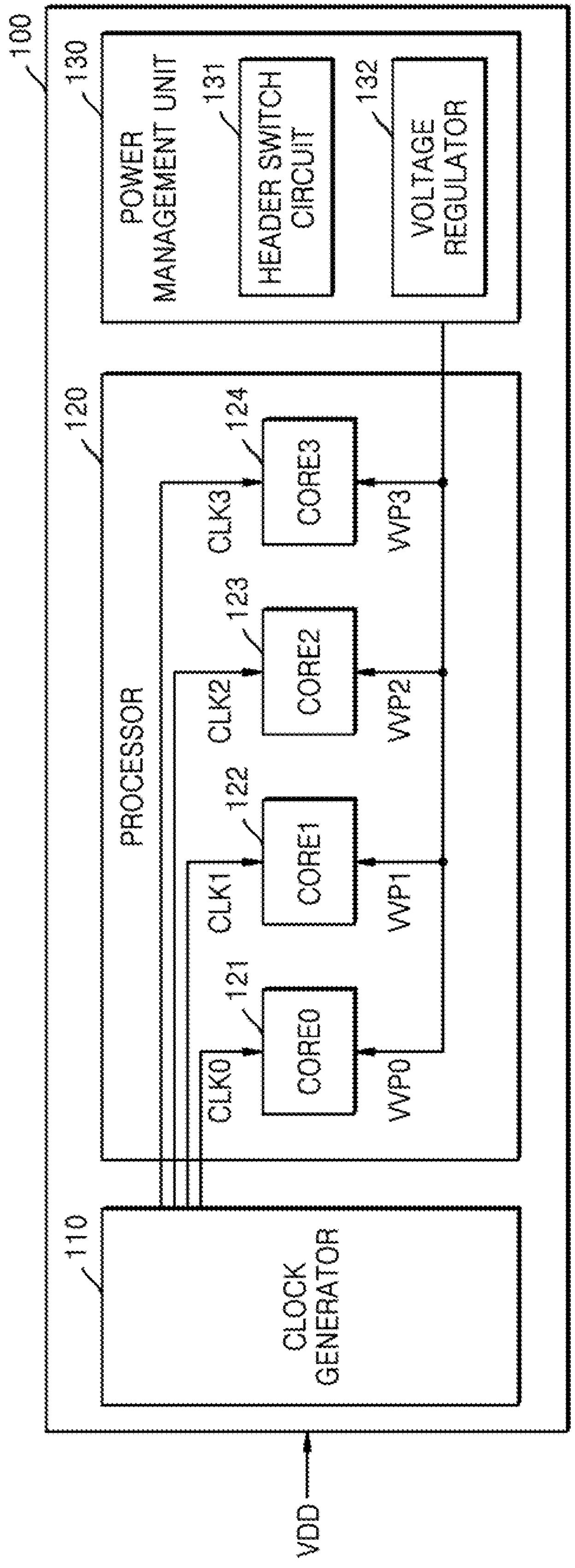
FIG. 1 is a block diagram of a system on chip (SoC) according to an embodiment.

Hereinafter, embodiments will be described in detail with reference to the accompanying drawings. Embodiments are provided to describe the disclosure more fully to those of ordinary skill in the art. The disclosure may allow various kinds of change or modification and various changes in form, and specific embodiments will be illustrated in drawings and described in detail in the specification. However, it should be understood that the specific embodiments do not limit the disclosure to a specific disclosing form but include every modified, equivalent, or replaced one within the spirit and technical scope of the disclosure. Like reference numerals in the drawings denote like elements. In the accompanying drawings, sizes of structures are magnified or reduced than real values to clearly describe the disclosure.

It will be understood that when an element or layer is referred to as being "over," "above," "on," "below," "under," "beneath," "connected to" or "coupled to" another element or layer, it can be directly over, above, on, below, under, beneath, connected or coupled to the other element or layer or intervening elements or layers may be present. In contrast, when an element is referred to as being "directly over," "directly above," "directly on," "directly below," "directly under," "directly beneath," "directly connected to" or "directly coupled to" another element or layer, there are no intervening elements or layers present. Like numerals refer to like elements throughout.

Spatially relative terms, such as "over," "above," "on," "upper," "below," "under," "beneath," "lower," and the like, may be used herein for ease of description to describe one element's or feature's relationship to another element(s) or feature(s) as illustrated in the figures. It will be understood that the spatially relative terms are intended to encompass different orientations of the device in use or operation in addition to the orientation depicted in the figures. For example, if the device in the figures is turned over, elements described as "below" or "beneath" other elements or features would then be oriented "above" the other elements or features. Thus, the term "below" can encompass both an orientation of above and below. The device may be otherwise oriented (rotated 90 degrees or at other orientations) and the spatially relative descriptors used herein interpreted accordingly.

For the sake of brevity, conventional elements to semiconductor devices may or may not be described in detail herein for brevity purposes.

FIG. 1 is a block diagram of a system on chip (SoC) 100 according to an embodiment of the inventive concept.

Referring to FIG. 1, the SoC 100 may be a technology-intensive semiconductor having an entire system contained in a single chip. That is, the SoC 100 may be a single chip implemented by a system including devices having several functions. By integrating devices having several functions in a single chip, a product may be miniaturized, and manufacturing costs may be reduced compared to when semiconductors having respective functions are individually manufactured. The SoC 100 may receive an external supply voltage VDD from the outside to perform several functions.

The SoC 100 according to an embodiment may include a clock generator 110, a processor 120, and a power management unit 130.

The clock generator 110 may generate at least one clock signal. In addition, the clock generator 110 may output the generated at least one clock signal to the processor 120. For example, the clock generator 110 may generate first to fourth clock signals CLK0, CLK1, CLK2, and CLK3 and respectively output the first to fourth clock signals CLK0, CLK1, CLK2, and CLK3 to first to fourth cores 121, 122, 123, and 124. However, the disclosure is not limited thereto, and the number of clock signals may change according to the number of cores. The clock generator 110 may independently turn on or off a plurality of clock signals. For example, the clock generator 110 may suspend supplying only the first clock signal CLK0 among the first to fourth clock signals CLK0, CLK1, CLK2, and CLK3. As another example, the clock generator 110 may suspend supplying only the second and third clock signals CLK1 and CLK2 among the first to fourth clock signals CLK0, CLK1, CLK2, and CLK3. However, the disclosure is not limited thereto. A frequency of each clock signal may be determined according to the performance of each core. For example, when the performance of the first core 121 is the highest, and the performance of the fourth core 124 is the lowest, a frequency of the first clock signal CLK0 among the first to fourth clock signals CLK0, CLK1, CLK2, and CLK3 may be the highest, and a frequency of the fourth clock signal CLK3 may be the lowest. However, the disclosure is not limited thereto.

In an embodiment, the clock generator 110 may suspend the provision of at least one clock signal among the plurality of clock signals in response to a state signal received from the processor 120. For example, the clock generator 110 may suspend supplying the first clock signal CLK0 in response to a state signal received from the first core 121. As another example, the clock generator 110 may suspend supplying the third and fourth clock signals CLK2 and CLK3 in response to state signals which the third and fourth cores 123 and 124 respectively output. Herein, a state signal may be a signal indicating a clock gating state. The clock gating state may be a state in which a core completes an operation being currently performed and waits for a next operation. Alternatively, the clock gating state may be a state in which supplying a clock signal is suspended.

In an embodiment, the clock generator 110 may include a phase locked loop (PLL), a delay locked loop (DLL), an oscillator, and a clock management unit.

The processor 120 may execute programs stored in the SoC 100. Alternatively, the processor 120 may process data stored in the SoC 100, data provided from the outside, and the like. For example, the processor 120 may execute programs and process data in response to a clock signal provided from the clock generator 110.

In an embodiment, the processor 120 may include at least one core. For example, the processor 120 may include the first to fourth cores 121, 122, 123, and 124. However, the disclosure is not limited thereto, and the processor 120 may include various numbers of cores, such as two, six, and eight cores. Among the plurality of cores, a core having the highest performance and a core having the lowest performance may be included in the processor 120. For example, among the first to fourth cores 121, 122, 123, and 124, the performance of the first core 121 may be the highest, and the performance of the fourth core 124 may be the lowest. However, the disclosure is not limited thereto. A core having the highest performance may be referred to as a "big core", and a core having the lowest performance may be referred to as a "little core". In addition, a core having a higher performance than a little core and having a lower performance than a big core may be referred to as a "middle core".

In an embodiment, the plurality of cores included in the processor 120 may receive a supply voltage from the power management unit 130. For example, the first core 121 may receive a first supply voltage VVP0 from the power management unit 130. The second core 122 may receive a second supply voltage VVP1. The third core 123 may receive a third supply voltage VVP2. The fourth core 124 may receive a fourth supply voltage VVP3.

In an embodiment, the first to fourth cores 121, 122, 123, and 124 may receive the first to fourth supply voltages VVP0, VVP1, VVP2, and VVP3 and perform operations in response to the first to fourth clock signals CLK0, CLK1, CLK2, and CLK3, respectively.

The power management unit 130 may manage a supply voltage based on the external supply voltage VDD and provide the supply voltage to the processor 120. For example, the power management unit 130 may generate the first to fourth supply voltages VVP0, VVP1, VVP2, and VVP3 by regulating the external supply voltage VDD and respectively provide the first to fourth supply voltages VVP0, VVP1, VVP2, and VVP3 to the first to fourth cores 121, 122, 123, and 124.

In an embodiment, when the first to fourth cores 121, 122, 123, and 124 perform an operation, the first to fourth supply voltages VVP0, VVP1, VVP2, and VVP3 may all be the same as a supply voltage supplied to a core having the highest performance. For example, when the first core 121 is a big core, the second to fourth supply voltages VVP1, VVP2, and VVP3 may be the same as the first supply voltage VVP0. However, the disclosure is not limited thereto.

In an embodiment, the power management unit 130 may manage a supply voltage in a state in which supplying a corresponding clock signal is suspended to a core having the clock gating state. For example, when at least one core among the first to fourth cores 121, 122, 123, and 124 has the clock gating state, a supply voltage supplied to the at least one core having the clock gating state may be lower than a supply voltage supplied to a core having the highest performance. For example, when the first core 121 is a big core, and the fourth core 124 has the clock gating state, the fourth supply voltage VVP3 may be lower than the first supply voltage VVP0. However, the disclosure is not limited thereto.

In an embodiment, the power management unit 130 may generate a supply voltage based on the external supply voltage VDD and provide the supply voltage to a core having the clock gating state. In addition, the power management unit 130 may increase the supply voltage every time the supply voltage supplied to the core having the clock gating state is lower than a preset target voltage. Herein, the target voltage may be a reference voltage required to maintain the clock gating state. Data indicating a value of the target voltage may be stored in a register included in the power management unit 130. The power management unit 130 may detect the supply voltage and determine an increased amount of the supply voltage according to a difference between the target voltage and the supply voltage.

In an embodiment, the power management unit 130 may include a header switch circuit 131 and a voltage regulator 132. A plurality of header switch circuits 131 may be included. Each header switch circuit 131 may include a plurality of header switches. However, the disclosure is not limited thereto, and each header switch circuit 131 may further include a buffer configured to buffer a received control signal and output the buffered control signal. In an embodiment, the voltage regulator 132 may be implemented by a low dropout (LDO). The LDO may be a linear regulator operating even in a low input and output potential difference.

In an embodiment, the plurality of header switch circuits 131 may connect a power rail, through which the external supply voltage VDD is supplied, to power rails through which supply voltages are supplied, in response to a plurality of control signals, respectively. By connecting the power rail through which the external supply voltage VDD is supplied to a power rail through which a supply voltage is supplied, the supply voltage may be delivered to a core.

In an embodiment, the plurality of header switch circuits 131 may deliver a supply voltage reduced from the external supply voltage VDD to a core having the clock gating state, in response to the plurality of control signals.

In an embodiment, the voltage regulator 132 may compare a supply voltage with the preset target voltage and generate the plurality of control signals based on a comparison result.

In an embodiment, the voltage regulator 132 may monitor a supply voltage, change logic levels of the plurality of control signals according to a difference level corresponding to a difference between the supply voltage and the preset target voltage, and output the plurality of control signals, the logic levels of which have been changed, to the plurality of header switches.

Figure 2:
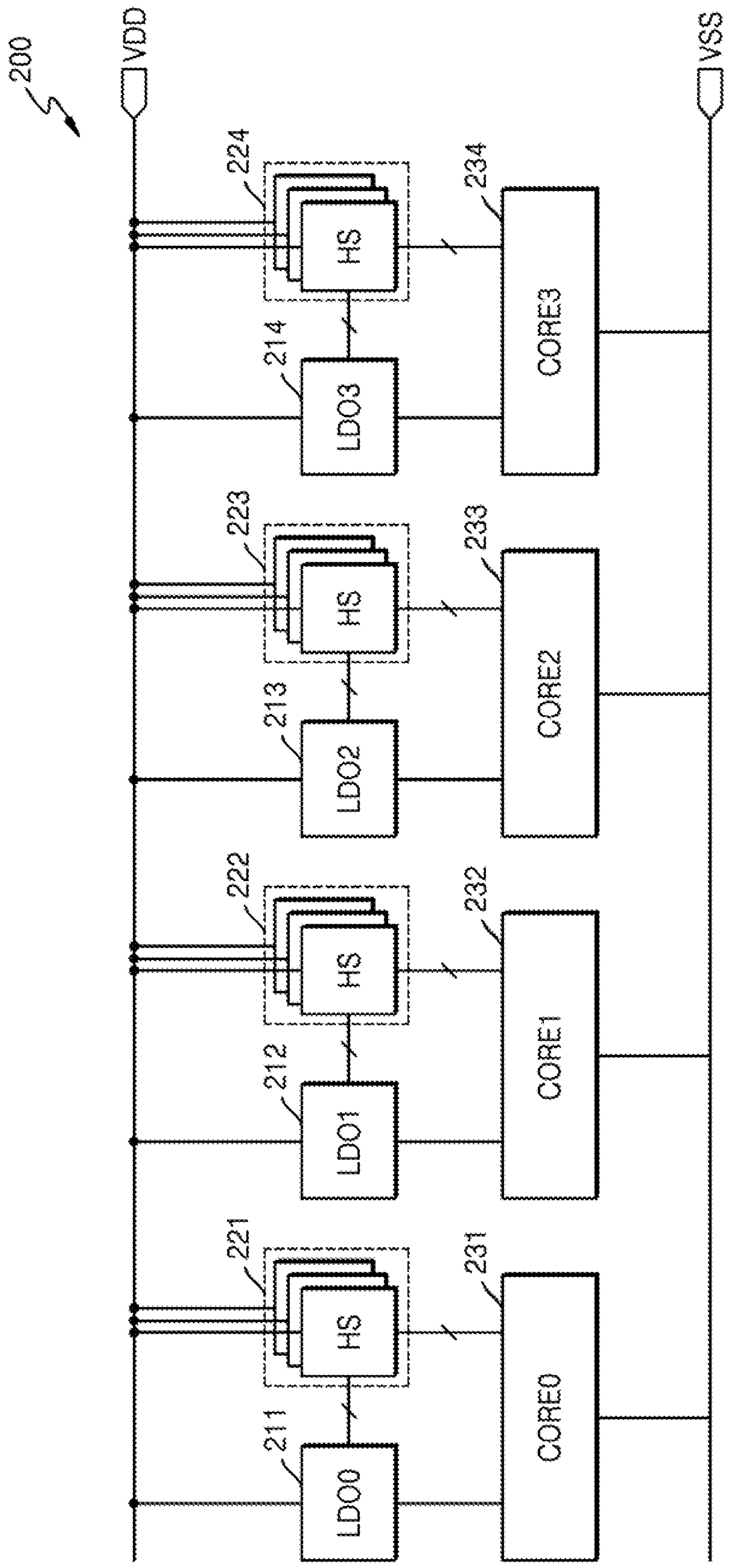
FIG. 2 is a block diagram of a plurality of low dropouts (LDOs), a plurality of header switches, and a plurality of cores according to an embodiment.

FIG. 2 is a block diagram of a plurality of LDOs, a plurality of header switches, and a plurality of cores according to an embodiment. In FIG. 2, it is assumed for convenience of description that the number of LDOs and the number of cores are four.

Referring to FIG. 2, an SoC 200 may include first to fourth LDOs 211, 212, 213, and 214, first to fourth header switch groups 221, 222, 223, and 224, and first to fourth cores 231, 232, 233, and 234.

The first to fourth LDOs 211, 212, 213, and 214 may perform an operation of the voltage regulator 132 described above with reference to FIG. 1. The first to fourth LDOs 211, 212, 213, and 214 may be connected to the power rail through which the external supply voltage VDD is supplied. In addition, the first to fourth LDOs 211, 212, 213, and 214 may be connected to the first to fourth header switch groups 221, 222, 223, and 224. In addition, the first to fourth LDOs 211, 212, 213, and 214 may be connected to the first to fourth cores 231, 232, 233, and 234.

The first to fourth header switch groups 221, 222, 223, and 224 may be connected to the power rail through which the external supply voltage VDD is supplied. In addition, the first to fourth header switch groups 221, 222, 223, and 224 may be connected to the first to fourth cores 231, 232, 233, and 234. The first to fourth header switch groups 221, 222, 223, and 224 may operate as a switch for power gating. Each of the first to fourth header switch groups 221, 222, 223, and 224 may include a plurality of header switches HS. Each header switch HS may be turned on in response to a turn-on level of a control signal.

The first to fourth cores 231, 232, 233, and 234 may be connected to a power rail through which a ground voltage VSS is applied. In an embodiment, the ground voltage VSS may have a voltage level lower than a voltage level of the external supply voltage VDD, and particularly, the ground voltage VSS may be ground.

In an embodiment, the second core 232 among the first to fourth cores 231, 232, 233, and 234 may be a big core. When the first core 231 is in the clock gating state, and the second core 232 is not in the clock gating state, the first core 231 may receive a first supply voltage, and the second core 232 may perform an operation in response to a second clock signal based on a second supply voltage obtained by regulating the external supply voltage VDD. In this case, the first supply voltage may have a voltage level lower than that of the second supply voltage. The second clock signal may have a frequency greater than a frequency of a first clock signal. The first clock signal may be a signal for operating the first core 231. However, the disclosure is not limited thereto.

In an embodiment, the first core 231 may receive the first clock signal. In this case, in a state in which the first core 231 receives the first clock signal, the first supply voltage supplied to the first core 231 may have a voltage level higher than a voltage level of a target voltage and lower than or equal to the voltage level of the external supply voltage VDD. However, the disclosure is not limited thereto, and the second to fourth cores 232, 233, and 234 may also operate in the same manner.

Figure 3A:
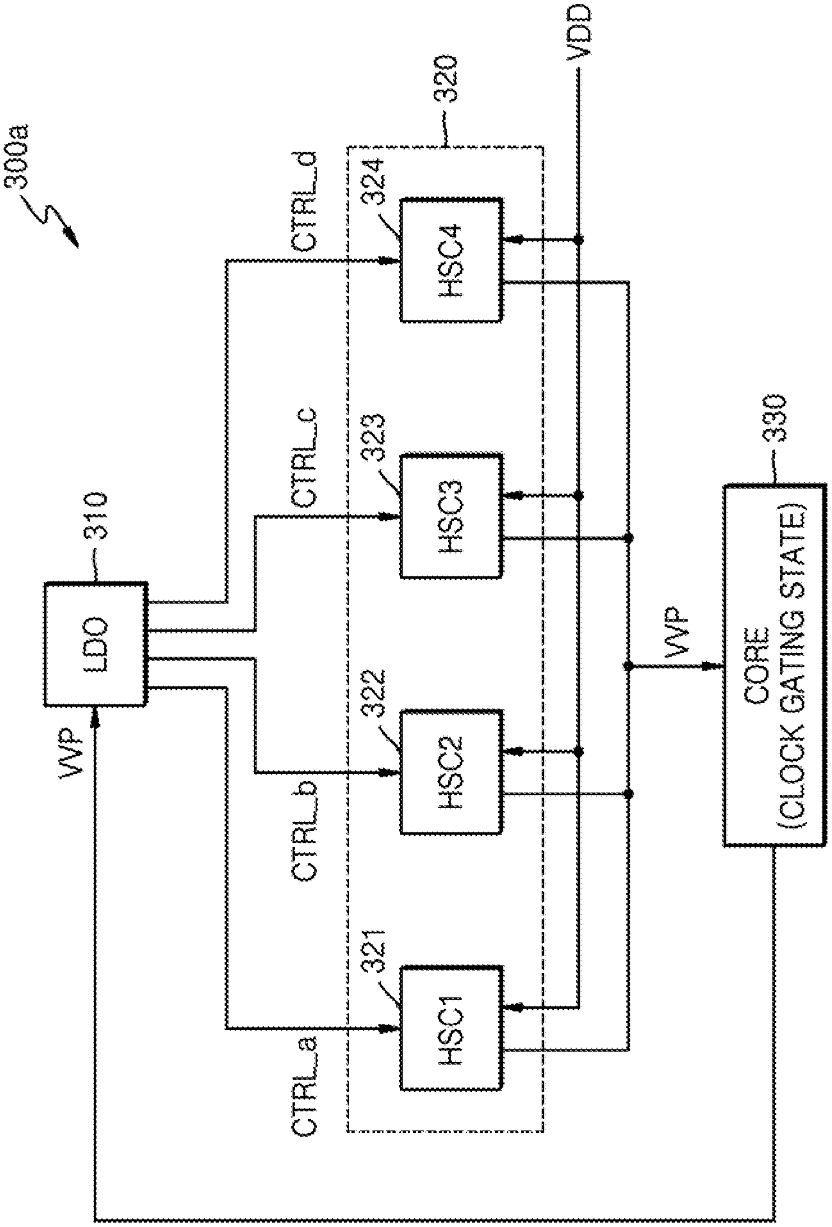
FIGS. 3A to 3C are block diagrams of an LDO, a plurality of header switch circuits, and a core according to embodiments.
Figure 3B:
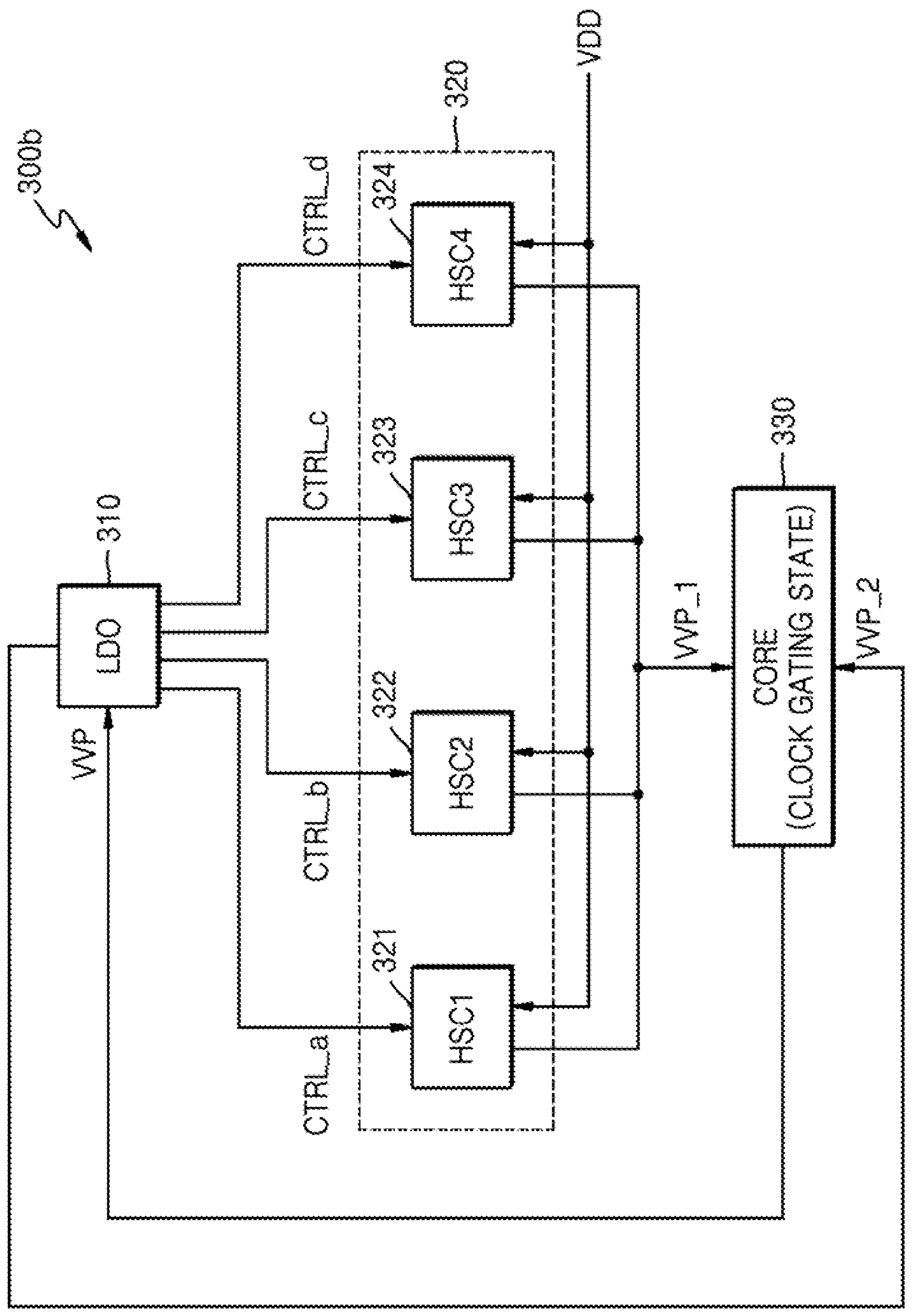
Figure 3C:
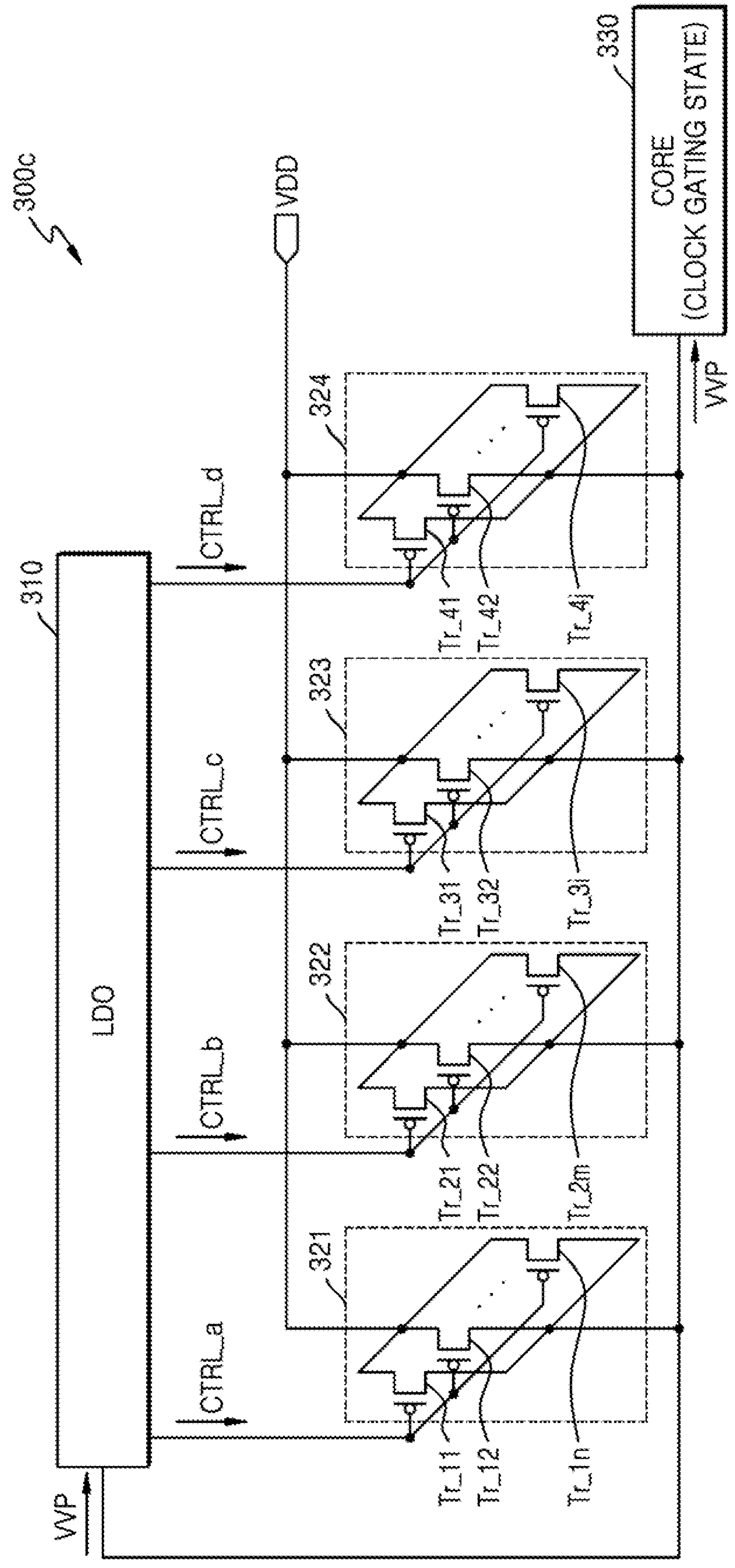

FIGS. 3A to 3C are block diagrams of an LDO, a plurality of header switch circuits, and a core according to embodiments of the disclosure.

Referring to FIG. 3A, an SoC 300*a* may be the SoC 100 shown in FIG. 1 or the SoC 200 shown in FIG. 2. The SoC 300*a* may include an LDO 310, a header switch circuit group 320, and a core 330.

The LDO 310 may be any one of the first to fourth LDOs 211, 212, 213, and 214 shown in FIG. 2. As an example with reference to FIGS. 2 and 3A, the LDO 310 may be the first LDO 211. However, the disclosure is not limited thereto.

The LDO 310 may generate a plurality of control signals to be provided to the header switch circuit group 320. Each of the plurality of control signals may be a signal to be provided to the header switch circuit group 320 to manage a supply voltage. The plurality of control signals may correspond to each of the header switch circuits included in the header switch circuit group 320. For example, when the header switch circuit group 320 includes first to fourth header switch circuits 321, 322, 323, and 324, the LDO 310 may generate first to fourth control signals CTRL_a, CTRL_b, CTRL_c, and CTRL_d.

The LDO 310 may monitor a supply voltage VVP provided to the core 330. Particularly, the LDO 310 may receive the supply voltage VVP provided to the core 330, compare the supply voltage VVP with a preset target voltage, and change a logic level of each of the plurality of control signals, e.g., the first to fourth control signals CTRL_a, CTRL_b, CTRL_c, and CTRL_d, according to a comparison result.

The header switch circuit group 320 may be included in any one of the first to fourth header switch groups 221, 222, 223, and 224 shown in FIG. 2. Particularly, the header switch circuit group 320 may include some of the plurality of header switches included in the first to fourth header switch groups 221, 222, 223, and 224 shown in FIG. 2. As an example with reference to FIGS. 2 and 3A, the header switch circuit group 320 may include some of the plurality of header switches included in the first header switch group 221. However, the disclosure is not limited thereto. That is, some of a plurality of header switches included in each header switch group may be included in the header switch circuit group 320 as exclusive switches configured to provide a supply voltage for the core 330 to maintain the clock gating state, and the others thereof may be turned off when the core 330 is in the clock gating state, and provide the supply voltage when the core 330 is in a normal state.

The header switch circuit group 320 may deliver the supply voltage VVP, regulated from the external supply voltage VDD, to the core 330 in response to the plurality of control signals. The header switch circuit group 320 may include a plurality of header switch circuits. As an example with reference to FIG. 3A, the header switch circuit group 320 may include the first to fourth header switch circuits 321, 322, 323, and 324. However, the disclosure is not limited thereto.

The first header switch circuit 321 may deliver the supply voltage VVP to the core 330 by being turned on according to a logic level of the first control signal CTRL_a. The second header switch circuit 322 may deliver the supply voltage VVP to the core 330 by being turned on according to a logic level of the second control signal CTRL_b. The third header switch circuit 323 may deliver the supply voltage VVP to the core 330 by being turned on according to a logic level of the third control signal CTRL_c. The fourth header switch circuit 324 may deliver the supply voltage VVP to the core 330 by being turned on according to a logic level of the fourth control signal CTRL_d.

Every time each one of the first to fourth header switch circuits 321, 322, 323, and 324 is additionally turned on, the supply voltage VVP may increase. In this case, an increased amount of the supply voltage VVP that is increased when any one of the first to fourth header switch circuits 321, 322, 323, and 324 is turned on may vary and may be a quantized value.

When some of the first to fourth header switch circuits 321, 322, 323, and 324 provide the supply voltage VVP, a sum of the supply voltages VVP may be lower than the external supply voltage VDD.

The core 330 may be any one of the first to fourth cores 231, 232, 233, and 234 shown in FIG. 2. As an example with reference to FIGS. 2 and 3A, the core 330 may be the first core 231. However, the disclosure is not limited thereto.

The core 330 may have the clock gating state. The core 330 may receive the supply voltage VVP for maintaining the clock gating state.

Referring to FIG. 3B, an SoC 300*b* may include the LDO 310, the header switch circuit group 320, and the core 330 like the SoC 300*a* shown in FIG. 3A.

The LDO 310 included in the SoC 300*b* may provide a compensation supply voltage VVP_2 to the core 330. Because a voltage level of a supply voltage VVP_1 increased by the header switch circuit group 320 is quantized, when the voltage level of the supply voltage VVP_1 is lower than a voltage level of a target voltage, it may be difficult to accurately match the voltage level of the supply voltage VVP_1 with the voltage level of the target voltage using only the header switch circuit group 320. In this case, the compensation supply voltage VVP_2 may be additionally supplied to the core 330. That is, in the clock gating state of the core 330, a sum of a voltage level of the compensation supply voltage VVP_2 and the voltage level of the supply voltage VVP_1 may correspond to the voltage level of the target voltage. Accordingly, the core 330 may stably maintain the clock gating state.

Each of the first to fourth header switch circuits 321, 322, 323, and 324 may include header switches. A header switch may be implemented by a transistor.

Referring to FIG. 3C, an SoC 300*c* may include the LDO 310, the first to fourth header switch circuits 321, 322, 323, and 324, and the core 330.

The first to fourth header switch circuits 321, 322, 323, and 324 may include different numbers of header switches. For example, the first header switch circuit 321 may include n transistors Tr_11, Tr_12, . . . , Tr_1*n*, the second header switch circuit 322 may include m transistors Tr_21, Tr_22, . . . , Tr_2*m*, the third header switch circuit 323 may include i transistors Tr_31, Tr_32, . . . , Tr_3*i*, and the fourth header switch circuit 324 may include j transistors Tr_41, Tr_42, . . . , Tr_4*j*.

In an embodiment, the number of header switches included in a kth header switch circuit (k is an integer greater than or equal to 2) among a plurality of header switch circuits may be double the number of header switches included in a (k−1)th header switch circuit. Particularly, for example, the second header switch circuit 322 may include the m transistors Tr_21, Tr_22, . . . , Tr_2*m* where m is 2*n*. The third header switch circuit 323 may include the i transistors Tr_31, Tr_32, . . . , Tr_3*i* where i is 2*m* or 4*n*. The fourth header switch circuit 324 may include the j transistors Tr_41, Tr_42, . . . , Tr_4*j* where j is 2*i*, 4*m*, or 8*n*. However, the disclosure is not limited thereto.

In an embodiment, a transistor included in each header switch circuit may be a positive metal oxide semiconductor (PMOS) transistor. In this case, the turn-on level of a control signal may be a logic low level, and a turn-off level of the control signal may be a logic high level. However, the disclosure is not limited thereto, and a transistor included in each header switch circuit may also be implemented by a negative metal oxide semiconductor (NMOS) transistor.

Transistors included in each header switch circuit may be connected in parallel. A control signal may be applied to gates of the parallel-connected transistors, first electrodes (or drain electrodes) of the parallel-connected transistors may be connected to a power rail through which the external supply voltage VDD is applied, and second electrodes (or source electrodes) of the parallel-connected transistors may be connected to a power rail through which the supply voltage VVP is applied.

In an embodiment, when a header switch circuit including a preset number or more of header switches among a plurality of header switch circuits is turned on, the supply voltage VVP corresponding to a target voltage may be delivered to the core 330. As an example with reference to FIG. 3C, when the preset number of header switches is j, the fourth header switch circuit 324 may be turned on to deliver the supply voltage VVP corresponding to the target voltage to the core 330. However, the disclosure is not limited thereto.

In an embodiment, a header switch circuit including a largest number of header switches among the plurality of header switch circuits may connect the power rail through which the external supply voltage VDD is supplied to the power rail through which the supply voltage VVP is supplied, in response to a control signal of the turn-on level. In this case, the supply voltage VVP corresponding to the target voltage may be delivered to the core 330. As an example with reference to FIG. 3C, when a header switch circuit including the most number of header switches is the fourth header switch circuit 324, the fourth header switch circuit 324 may be turned on in response to the fourth control signal CTRL_d of the turn-on level to deliver the supply voltage VVP corresponding to the target voltage to the core 330. However, the disclosure is not limited thereto.

Figure 4:
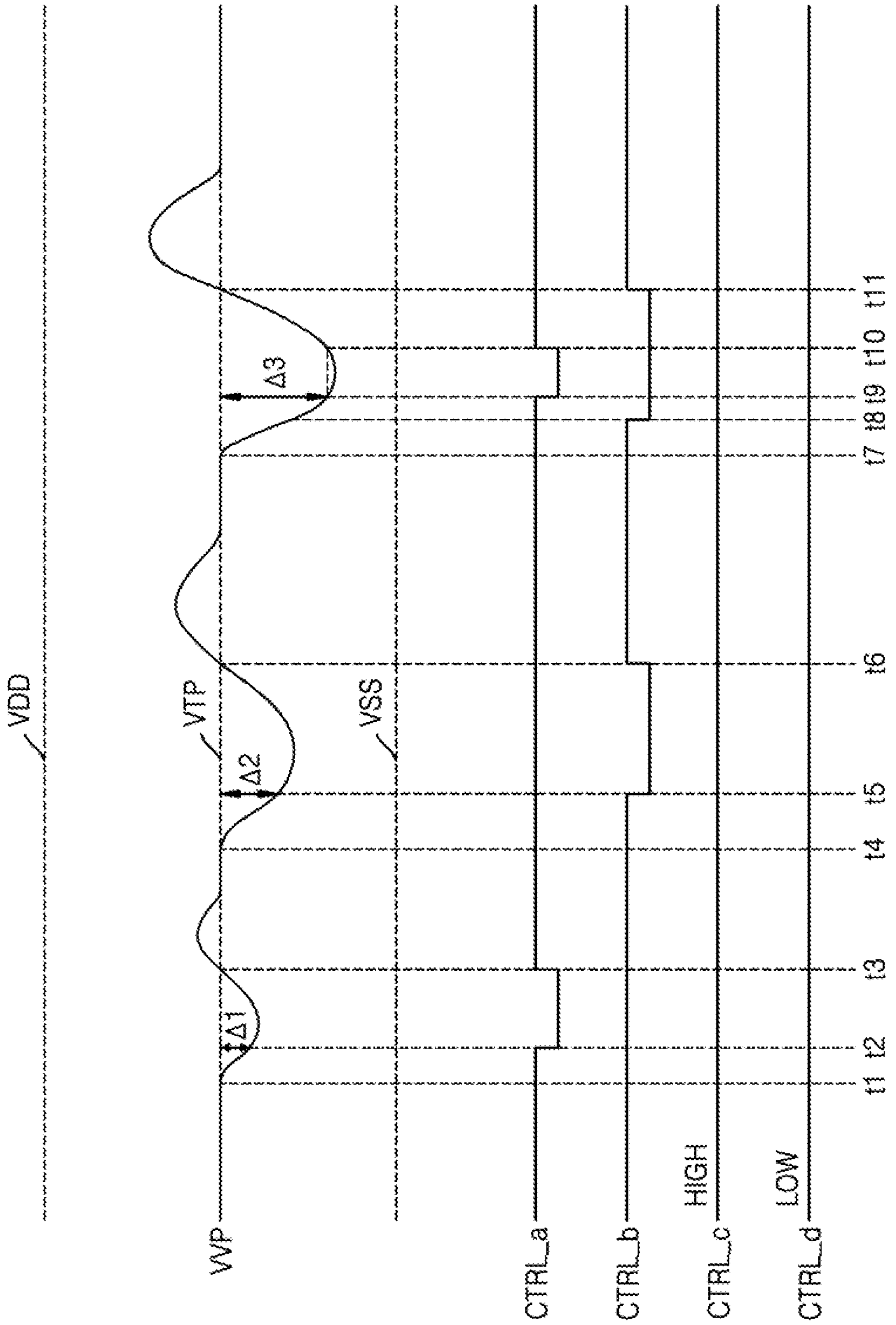
FIG. 4 is a timing diagram of a supply voltage and a plurality of control signals according to an embodiment.

FIG. 4 is a timing diagram of a supply voltage and a plurality of control signals according to an embodiment of the disclosure.

Referring to FIG. 4, a kth control signal among first to kth control signals may have the turn-on level. In addition, for each integer r greater than or equal to 2 and less than or equal to k, the number of header switches included in an rth header switch circuit among first to kth header switch circuits may be double the number of header switches included in an (r−1)th header switch circuit. Header switches included in the kth header switch circuit may be turned on in response to the kth control signal. As an example with reference to FIGS. 3C and 4, the LDO 310 may output the first to third control signals CTRL_a, CTRL_b, and CTRL_c of the turn-off level to the first to third header switch circuits 321, 322, and 323, respectively. In addition, the LDO 310 may output the fourth control signal CTRL_d of the turn-on level to the fourth header switch circuit 324. As shown in FIG. 4, for example, the turn-on level may be a logic low level LOW, and the turn-off level may be a logic high level HIGH. Each of the supply voltage VVP and a target voltage VTP may have a voltage level lower than that of the external supply voltage VDD. In addition, the supply voltage VVP may maintain the same voltage level as that of the target voltage VTP.

At a first time point t1, according to a change in an internal temperature or the like of the SoC 300*a*, 300*b*, or 300*c*, the supply voltage VVP supplied by the fourth header switch circuit 324 may decrease. In this case, the LDO 310 may change a logic level of at least one of the first to (k−1)th control signals to the turn-on level according to a difference level Δ corresponding to a difference between the target voltage VTP and the supply voltage VVP. As an example with reference to FIGS. 3C and 4, the LDO 310 may change a logic level of at least one of the first to third control signals CTRL_a, CTRL_b, and CTRL_c to the turn-on level according to the difference level Δ. Particularly, for example, at a second time point t2, when the difference between the voltage level of the target voltage VTP and the voltage level of the supply voltage VVP is a first difference level Δ1, the LDO 310 may change a logic level of the first control signal CTRL_a from the turn-off level to the turn-on level. In this case, the first header switch circuit 321 may be turned on in response to the first control signal CTRL_a of the turn-on level. The supply voltage VVP may increase by the first difference level Δ1 by the first header switch circuit 321 which is turned on. In this case, for a difference level additionally occurring after the second time point t2, the LDO 310 may supply the compensation supply voltage VVP_2 to the core 330.

At a third time point t3, the voltage level of the supply voltage VVP may reach the voltage level of the target voltage VTP. In this case, the LDO 310 may change the logic level of the first control signal CTRL_a from the turn-on level to the turn-off level. After the third time point t3, the voltage level of the supply voltage VVP may exceed the voltage level of the target voltage VTP and then maintain the same voltage level as that of the target voltage VTP.

At a fourth time point t4, according to a change in the internal temperature or the like of the SoC 300*a*, 300*b*, or 300*c*, the supply voltage VVP supplied by the fourth header switch circuit 324 may decrease. The difference between the target voltage VTP and the supply voltage VVP may be larger than the difference at time point t2. For example, at a fifth time point t5, the difference may be a second difference level Δ2 that is greater than the first difference level Δ1. In this case, the LDO 310 may change a logic level of the second control signal CTRL_b from the turn-off level to the turn-on level. The supply voltage VVP may increase by the second difference level Δ2 by the second header switch circuit 322 which is turned on, and the LDO 310 may supply the compensation supply voltage VVP_2 to the core 330.

At a sixth time point t6, when the voltage level of the supply voltage VVP reaches the voltage level of the target voltage VTP, the LDO 310 may change the logic level of the second control signal CTRL_b from the turn-on level to the turn-off level. After the sixth time point t6, the voltage level of the supply voltage VVP may be stabilized to the voltage level of the target voltage VTP.

At a seventh time point t7, according to a change in the internal temperature or the like of the SoC 300*a*, 300*b*, or 300*c*, the supply voltage VVP supplied by the fourth header switch circuit 324 may decrease by a third difference level Δ3 or more. In this case, the LDO 310 may change the logic level of the second control signal CTRL_b from the turn-off level to the turn-on level at an eighth time point t8. In addition, the LDO 310 may change the logic level of the first control signal CTRL_a from the turn-off level to the turn-on level at a ninth time point t9. The LDO 310 may additionally supply the compensation supply voltage VVP_2 to the core 330.

At a tenth time point t10, the LDO 310 may change the logic level of the first control signal CTRL_a from the turn-on level to the turn-off level. The LDO 310 may additionally supply the compensation supply voltage VVP_2 to the core 330.

At an eleventh time point t11, the LDO 310 may change the logic level of the second control signal CTRL_b from the turn-on level to the turn-off level, and after the eleventh time point t11, the voltage level of the supply voltage VVP may be stabilized to the voltage level of the target voltage VTP.

In an embodiment, a duration for which the logic level of the first control signal CTRL_a maintains the turn-on level may be shorter than a duration for which the logic level of the second control signal CTRL_b maintains the turn-on level.

When the difference level Δ is greater than the third difference level Δ3, only a logic level of the third control signal CTRL_c may be changed from the turn-off level to the turn-on level. In this case, the duration for which the logic level of the second control signal CTRL_b maintains the turn-on level may be shorter than a duration for which the logic level of the third control signal CTRL_c maintains the turn-on level. In addition, a number of cases in which the logic levels of the first to third control signals CTRL_a, CTRL_b, and CTRL_c are changed to the turn-on level according to the difference level Δ are not limited as shown in FIG. 4.

As described above, a leakage current generated from a core may be reduced by supplying a minimum supply voltage for maintaining the clock gating state to the core in the clock gating state.

In addition, as described above, a power consumption amount of an SoC may be reduced by supplying a minimum supply voltage for maintaining the clock gating state to a core.

FIG. 5 is a table of logic levels of a plurality of control signals varying with a difference level, according to an embodiment of the disclosure. In a description of the embodiment shown in FIG. 5, it is assumed that the first to fourth header switch circuits 321, 322, 323, and 324 have n, 2*n*, 4*n*, and 8*n* header switches, respectively, and the fourth header switch circuit 324 is turned on.

Referring to FIGS. 3C and 5, in an embodiment, first to (k−1)th control signals (k is an integer greater or equal to 2) may each correspond to individual bit values of k−1 bits, respectively. As an example with reference to FIG. 3C, when k is 4, 3-bit data may include “000” to “111”. “0” may correspond to the turn-off level as a logic level of a control signal, and “1” may correspond to the turn-on level as a logic level of a control signal The logic levels of the first to third control signals CTRL_a, CTRL_b, and CTRL_c may correspond to respective bit values of 3-bit data, and for example, “010” may indicate that the logic level of the first control signal CTRL_a is the turn-off level, the logic level of the second control signal CTRL_b is the turn-on level, and the logic level of the third control signal CTRL_c is the turn-off level. However, the disclosure is not limited thereto.

In an embodiment, the LDO 310 may generate bitwise data based on a quotient obtained by dividing a value of a difference level by a value of a preset unit voltage level. In addition, the LDO 310 may change logic levels of the first to (k−1)th control signals according to bit values of the bitwise quotient. This may be represented by Equation 1 below.

$$\Delta=\alpha\times X+\beta \qquad \text{[Equation 1]}$$

where Δ denotes a difference level, α denotes a unit voltage level, X denotes a quotient, and β denotes a remainder.

Particularly, for example, when the unit voltage level is 0.01 V, and the difference level is 0.03 V, then the quotient is 3, and the remainder is 0. When the quotient of 3 is represented bitwise as 3-bit data, the bitwise quotient may be “011”. In this case, the LDO 310 may generate the first control signal CTRL_a of the turn-on level, the second control signal CTRL_b of the turn-on level, and the third control signal CTRL_c of the turn-off level.

When the logic levels of the first to (k−1)th control signals are set according to a bitwise quotient, the number of possible settings may be “2 to the power of k−1”. Because transistors included in each header switch circuit are turned on in response to the turn-on level of a control signal, the number of turned-on combinations of the first to (k−1)th control signals may also be “2 to the power of k−1”. As an example with reference to FIGS. 3C and 5, because the number of cases in which the logic levels of the first to third control signals CTRL_a, CTRL_b, and CTRL_c are set according to bit values of a bitwise quotient is 8, the number of possible settings in which the first to third header switch circuits 321, 322, and 323 are turned on or off may also be 8.

However, when the remainder β described above is not 0, the LDO 310 may generate the compensation supply voltage VVP_2 having a voltage level corresponding to the remainder β obtained by dividing a value of the difference level Δ by a value of the preset unit voltage level α, based on the external supply voltage VDD.

As a particular example with reference to FIGS. 3B, 3C, and 5, when the unit voltage level is 0.01 V, and the difference level is 0.032 V, then the quotient is 3, and the remainder is 0.002 V. As described above, the LDO 310 may change the logic levels of the first to third control signals CTRL_a, CTRL_b, and CTRL_c according to the bitwise quotient “011” corresponding to the quotient of 3, respectively, generate the compensation supply voltage VVP_2 of 0.002 V based on the external supply voltage VDD, and supply the compensation supply voltage VVP_2 to the core 330.

As described above, power consumption of an SoC may be further reduced by accurately matching a supply voltage decreased by an internal temperature of the SoC with a voltage level of a target voltage.

Figure 6:
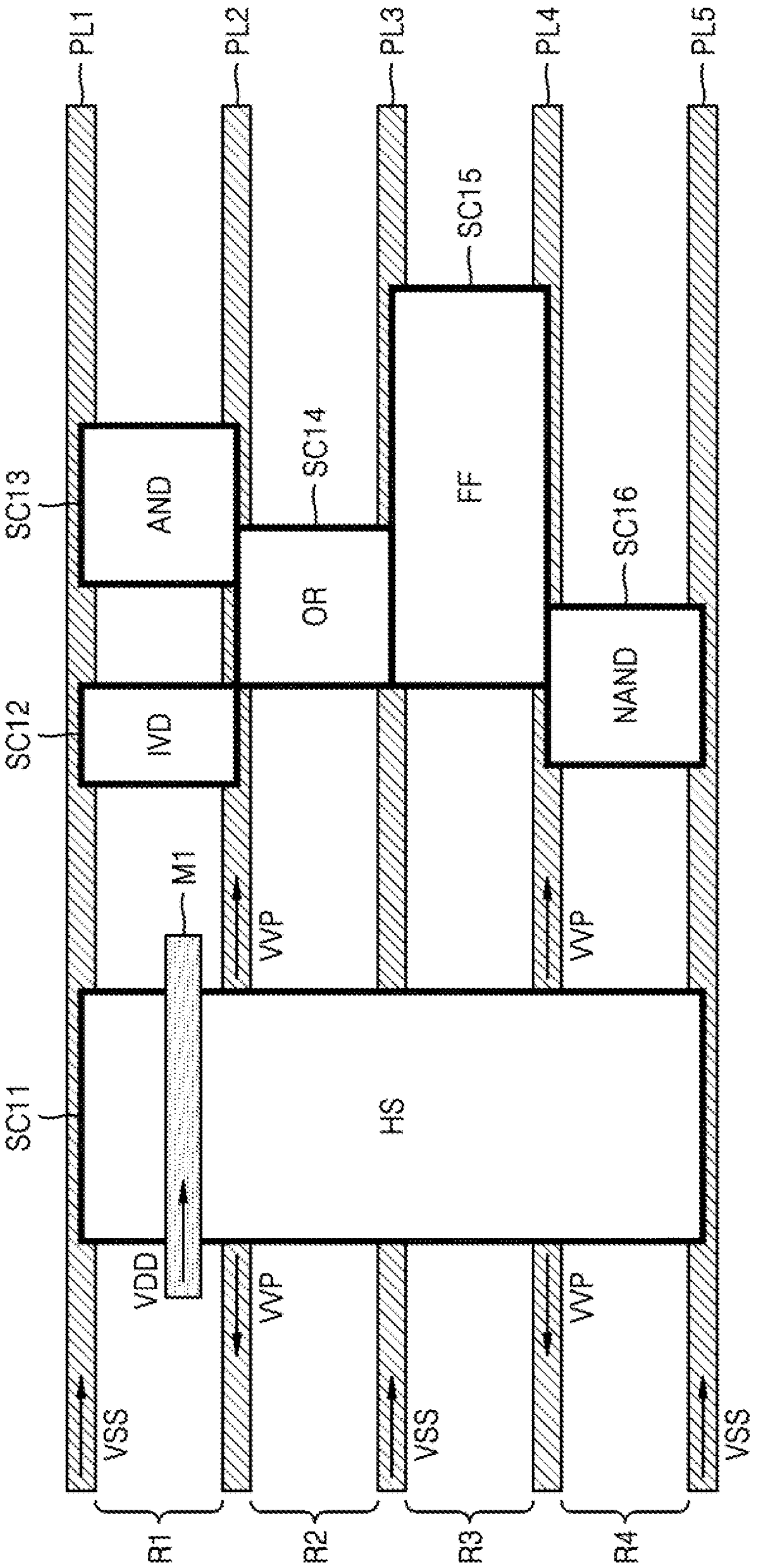
FIG. 6 is a layout diagram of a header switch and a core according to an embodiment.

FIG. 6 is a layout diagram of a header switch and a core according to an embodiment.

Referring to FIG. 6, first to fifth power lines PL1, PL2, PL3, PL4, and PL5 may be arranged in parallel to each other in a same direction as first to fourth rows R1, R2, R3, and R4. A power line may be referred to as a power rail. The first to fifth power lines PL1, PL2, PL3, PL4, and PL5 may be power lines to which the external supply voltage VDD and the ground voltage VSS are alternately applied. For example, the ground voltage VSS may be applied to the first power line PL1, the third power line PL3, and the fifth power line PL5, and the external supply voltage VDD may be applied to the second power line PL2 and the fourth power line PLA. However, the disclosure is not limited thereto.

A first standard cell SC11 may indicate that a header switch HS is implemented by a standard cell. The first standard cell SC11 may be arranged on the first to fifth power lines PL1, PL2, PL3, PL4, and PL5 and in a direction orthogonal to that of the first to fourth rows R1, R2, R3, and R4. However, the disclosure is not limited thereto. The first standard cell SC11 may electrically connect a metal layer M1 to which the external supply voltage VDD is supplied to the second and fourth power lines PL2 and PL4 to which the supply voltage VVP is supplied, in response to the turn-on level of a control signal. Herein, because the external supply voltage VDD is supplied to the metal layer M1, the metal layer M1 may also be referred to as a power line. In FIG. 6, an arrow indicating a direction in which each of the external supply voltage VDD and the ground voltage VSS is supplied is only to help the understanding of the disclosure and is not limited thereto.

A second standard cell SC12 may indicate that an instantaneous voltage drop (IVD) is implemented by a standard cell, and a third standard cell SC13 may indicate that an AND gate is implemented by a standard cell. The second standard cell SC12 and the third standard cell SC13 may be arranged in the first row R1 and between the first power line PL1 and the second power line PL2. The second standard cell SC12 and the third standard cell SC13 may receive the supply voltage VVP applied to the second power line PL2.

A fourth standard cell SC14 may indicate that an OR gate is implemented by a standard cell. The fourth standard cell SC14 may be arranged in the second row R2 and between the second power line PL2 and the third power line PL3. The fourth standard cell SC14 may receive the supply voltage VVP applied to the second power line PL2.

A fifth standard cell SC15 may indicate that a flip-flop is implemented by a standard cell. The fifth standard cell SC15 may be arranged in the third row R3 and between the third power line PL3 and the fourth power line PLA. The fifth standard cell SC15 may receive the supply voltage VVP applied to the fourth power line PLA.

A sixth standard cell SC16 may indicate that a NAND gate is implemented by a standard cell. The sixth standard cell SC16 may be arranged in the fourth row R4 and between the fourth power line PLA and the fifth power line PL5. The sixth standard cell C16 may receive the supply voltage VVP applied to the fourth power line PL4.

The second to sixth standard cells SC12, SC13, SC14, SC15, and SC16 may be included in a core according to an embodiment, e.g., the first core 121 shown in FIG. 1. However, the disclosure is not limited thereto.

Figure 7:
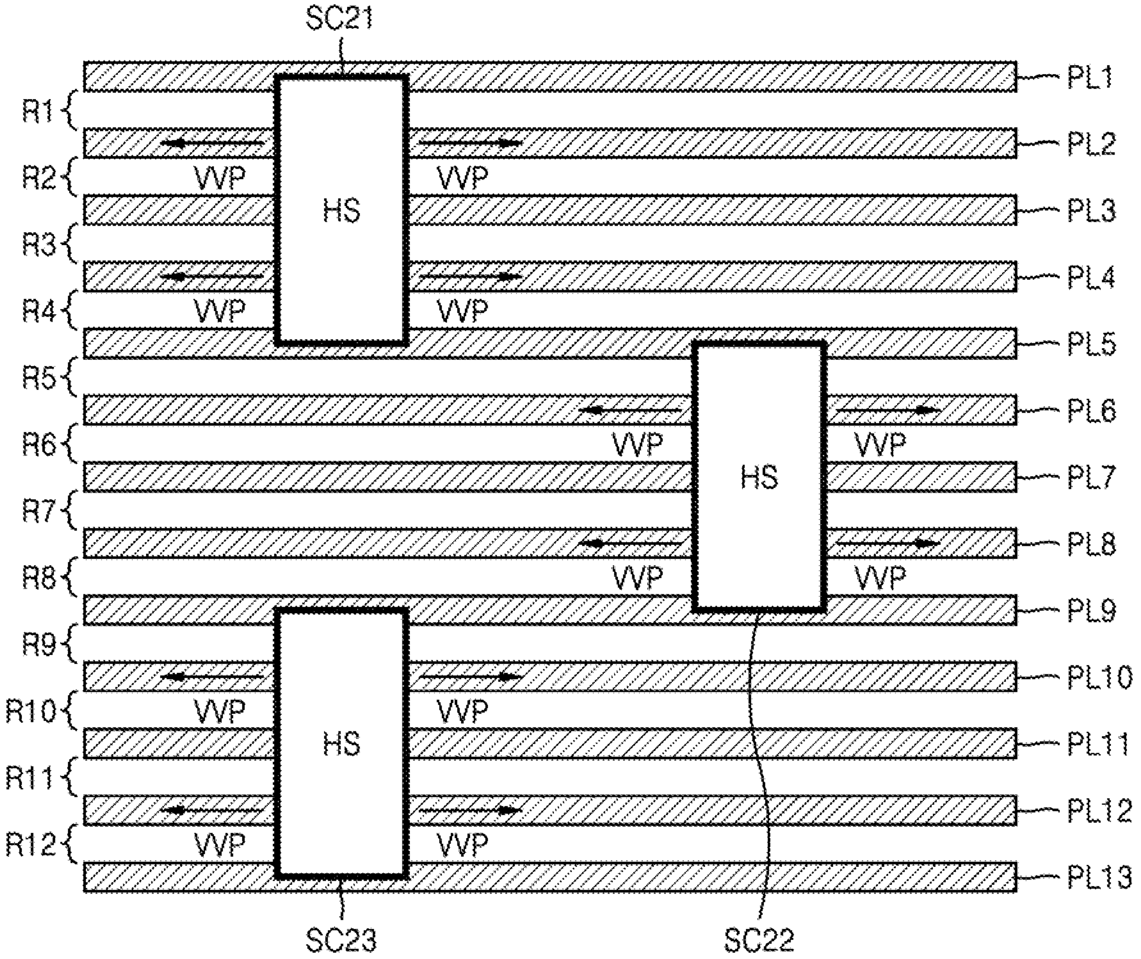
FIG. 7 illustrates an example in which a plurality of header switches provide a supply voltage.

FIG. 7 illustrates an example in which a plurality of header switches provide a supply voltage.

Referring to FIG. 7, first to thirteenth power lines PL1 to PL13 may be power lines which are arranged in parallel to each other in a same direction as first to twelfth rows R1 to R12, and to which the external supply voltage VDD and the ground voltage VSS are alternately applied. In FIG. 7, an arrow indicating a direction in which the ground voltage VSS is supplied is only to help the understanding of the disclosure and is not limited thereto.

First to third standard cells SC21, SC22, and SC23 may indicate that header switches HS are implemented by a standard cell. The first to third standard cells SC21, SC22, and SC23 may be arranged zigzag in a direction orthogonal to a direction of the first to twelfth rows R1 to R12 as shown, e.g., in FIG. 7.

The first standard cell SC21 may be arranged on the first to fifth power lines PL1, PL2, PL3, PL4, and PL5. The supply voltage VVP applied to the second and fourth power lines PL2 and PL4 may be supplied to standard cells arranged between the first to fifth power lines PL1, PL2, PL3, PL4, and PL5.

The second standard cell SC22 may be arranged on the fifth to ninth power lines PL5, PL6, PL7, PL8, and PL9. The supply voltage VVP applied to the sixth and eighth power lines PL6 and PL8 may be supplied to standard cells arranged between the fifth to ninth power lines PL5, PL6, PL7, PL8, and PL9.

The third standard cell SC23 may be arranged on the ninth to thirteenth power lines PL9, PL10, PL11, PL12, and PL13. The supply voltage VVP applied to the tenth and twelfth power lines PL10 and PL12 may be supplied to standard cells arranged between the ninth to thirteenth power lines PL9, PL10, PL11, PL12, and PL13.

Locations where the first to third standard cells SC21, SC22, and SC23 are arranged, power lines to which the supply voltage VVP is applied, and the like are not limited as shown in FIG. 7.

Figure 8:
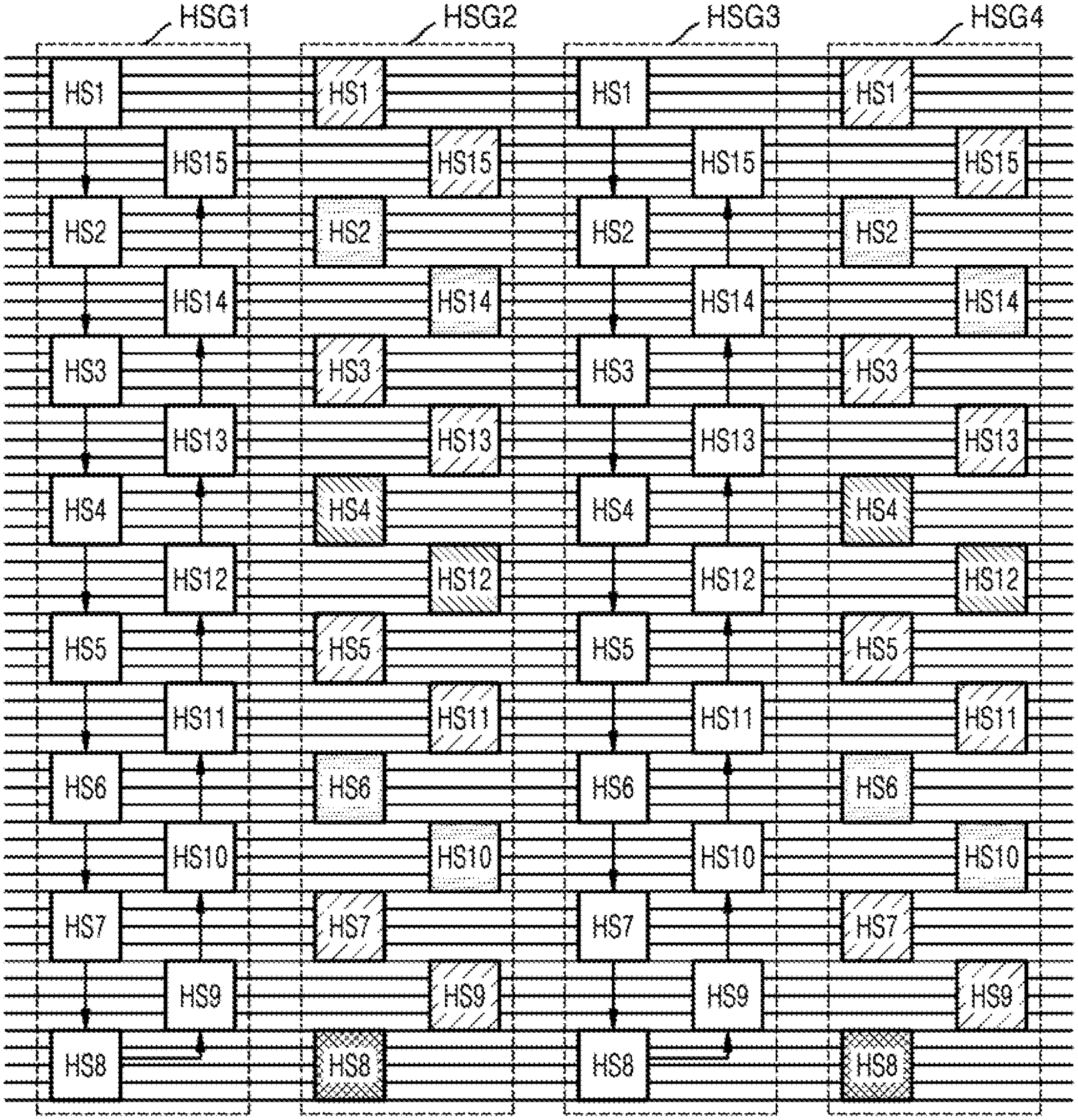
FIG. 8 illustrates a bus connection scheme set for each header switch group, according to an embodiment.

FIG. 8 illustrates a bus connection scheme set for each header switch group, according to an embodiment.

Referring to FIGS. 1 and 8, the SoC 100 according to an embodiment may include a plurality of standard cell groups, e.g., first to fourth standard cell groups HSG1, HSG2, HSG3, HSG4. A standard cell group may include standard cells in which header switches are implemented. The number of standard cells included in a standard cell group may be 15 but is not limited thereto. The number of standard cell groups and the number of standard cells are not limited as shown in FIG. 8.

In an embodiment, standard cells included in at least one of a plurality of standard cell groups may be connected to each other in a first bus connection scheme. As an example with reference to FIG. 8, standard cells included in the first standard cell group HSG1 among the first to fourth standard cell groups HSG1, HSG2, HSG3, HSG4 may be connected to each other in the first bus connection scheme and standard cells in the third standard cell group HSG3 among the first to fourth standard cell groups HSG1, HSG2, HSG3, HSG4 may be connected to each other in the first bus connection scheme. The first bus connection scheme may indicate a scheme in which standard cells are consecutively connected. The first bus connection scheme may be referred to as a daisy chain.

In an embodiment, the standard cell groups remaining by excluding the standard cell groups connected in the first bus connection scheme from the plurality of standard cell groups may be connected to each other in a second bus connection scheme. As an example with reference to FIG. 8, standard cells included in the second and fourth standard cell groups HSG2 and HSG4 among the first to fourth standard cell groups HSG1, HSG2, HSG3, HSG4 may be connected to each other in the second bus connection scheme. However, the disclosure is not limited thereto, and the number of standard cell groups connected in the second bus connection scheme may be at least one. The second bus connection scheme will be described below with reference to FIG. 9.

According to the first bus connection scheme and the second bus connection scheme, resources required to route a plurality of control signals may be reduced.

When the first to fourth standard cell groups HSG1, HSG2, HSG3, HSG4 are arranged in a column form, the intensity of the supply voltage VVP may gradually decrease away from a standard cell group due to a resistance according to a power line. Therefore, a difference in a leakage current per unit area may occur. To prevent a difference in the supply voltage VVP according to a distance separated from a standard cell group, a gap between standard cell groups may be reduced. Alternatively, a gap between standard cell groups may be reduced only for a location where a high leakage current is generated. However, it cannot be detected where a high leakage current flows as described above, and thus, an optimal standard cell group needs to be selected before shipping an SoC according to an embodiment of the disclosure.

In an embodiment, before shipping an SoC according to an embodiment of the disclosure, the LDO 310 may select any one of the second and fourth standard cell groups HSG2 and HSG4 connected in the second bus connection scheme as the header switch circuit group 320 which provides a supply voltage for maintaining the clock gating state.

In an embodiment, when the core 330 is in the clock gating state, the LDO 310 may provide a control signal of the turn-off level to the first and third standard cell groups HSG1 and HSG3 connected in the first bus connection scheme. In addition, the LDO 310 may control turn-on or turn-off of the second and fourth standard cell groups HSG2 and HSG4 connected in the second bus connection scheme by monitoring the supply voltage VVP and changing logic levels of a plurality of control signals so that the supply voltage VVP corresponds to the target voltage VTP. Accordingly, because only the second and fourth standard cell groups HSG2 and HSG4 may be turned on, a resistance may increase according to turn-on of some header switches, and the supply voltage VVP may decrease, thereby preventing unnecessary waste of power consumption.

Figure 9:
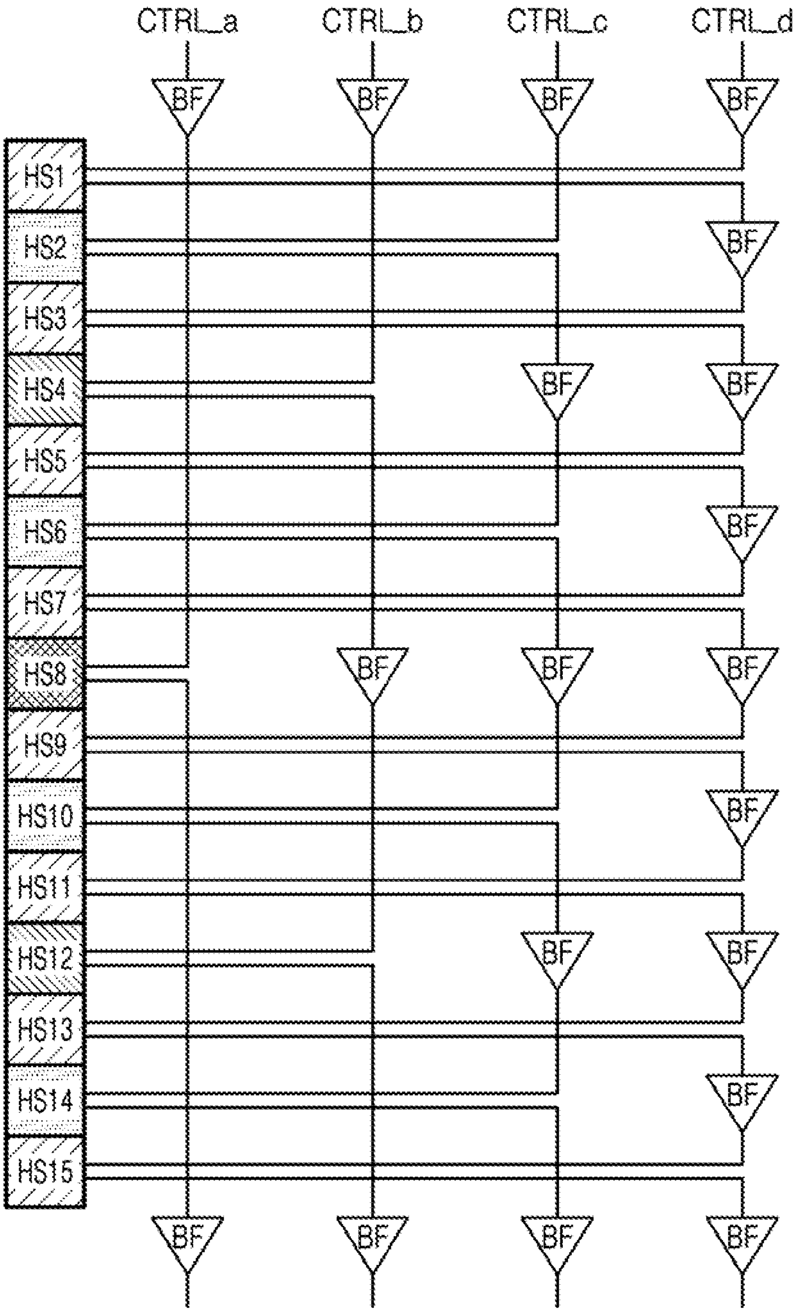
FIG. 9 illustrates a bus connection scheme of any one of a second header switch group and a fourth header switch group shown in FIG. 8.

FIG. 9 illustrates a bus connection scheme of any one of the second standard cell group (e.g., the second header switch group) HSG2 and the fourth standard cell group (e.g., the fourth header switch group) HSG4 shown in FIG. 8. In a description of the embodiment shown in FIG. 9, the description is made with reference to the second header switch group HSG2 for convenience of description.

Referring to FIG. 9, an eighth header switch HS8 among first to fifteenth header switches HS1 to HS15 included in the second header switch group HSG2 may be connected to a wire through which the first control signal CTRL_a is input. In addition, the eighth header switch HS8 may be connected to a different wire through which the input first control signal CTRL_a is output. To this end, the eighth header switch HS8 may include a buffer therein. The different wire through which the input first control signal CTRL_a is output may be connected to an eighth header switch included in a different header switch group connected in the second bus connection scheme.

The fourth and twelfth header switches HS4 and HS12 among the first to fifteenth header switches HS1 to HS15 included in the second header switch group HSG2 may be connected to a wire through which the second control signal CTRL_b is input, and connected to a different wire through which the input second control signal CTRL_b is output. To this end, each of the fourth and twelfth header switches HS4 and HS12 may include a buffer therein. The different wire through which the input second control signal CTRL_b is output may be connected to fourth and twelfth header switches included in a different header switch group connected in the second bus connection scheme.

The second, sixth, tenth, and fourteenth header switches HS2, HS6, HS10, HS14 among the first to fifteenth header switches HS1 to HS15 included in the second header switch group HSG2 may be connected to a wire through which the third control signal CTRL_c is input, and connected to a different wire through which the input third control signal CTRL_c is output. To this end, each of the second, sixth, tenth, and fourteenth header switches HS2, HS6, HS10, HS14 may include a buffer therein. The different wire through which the input third control signal CTRL_c is output may be connected to second, sixth, tenth, and fourteenth header switches included in a different header switch group connected in the second bus connection scheme.

The first, third, fifth, seventh, ninth, eleventh, thirteenth, and fifteenth header switches HS1, HS3, HS5, HS7, HS9, HS11, HS13, and HS15 among the first to fifteenth header switches HS1 to HS15 included in the second header switch group HSG2 may be connected to a wire through which the fourth control signal CTRL_d is input, and connected to a different wire through which the input fourth control signal CTRL_d is output. To this end, each of the first, third, fifth, seventh, ninth, eleventh, thirteenth, and fifteenth header switches HS1, HS3, HS5, HS7, HS9, HS11, HS13, and HS15 may include a buffer therein. The different wire through which the input fourth control signal CTRL_d is output may be connected to first, third, fifth, seventh, ninth, eleventh, thirteenth, and fifteenth header switches included in a different header switch group connected in the second bus connection scheme.

Buffers BF may be arranged on paths through which the first to fourth control signals CTRL_a, CTRL_b, CTRL_c, and CTRL_d flow. The buffers BF may prevent a decrease in the intensities of the first to fourth control signals CTRL_a, CTRL_b, CTRL_c, and CTRL_d.

Figure 10:
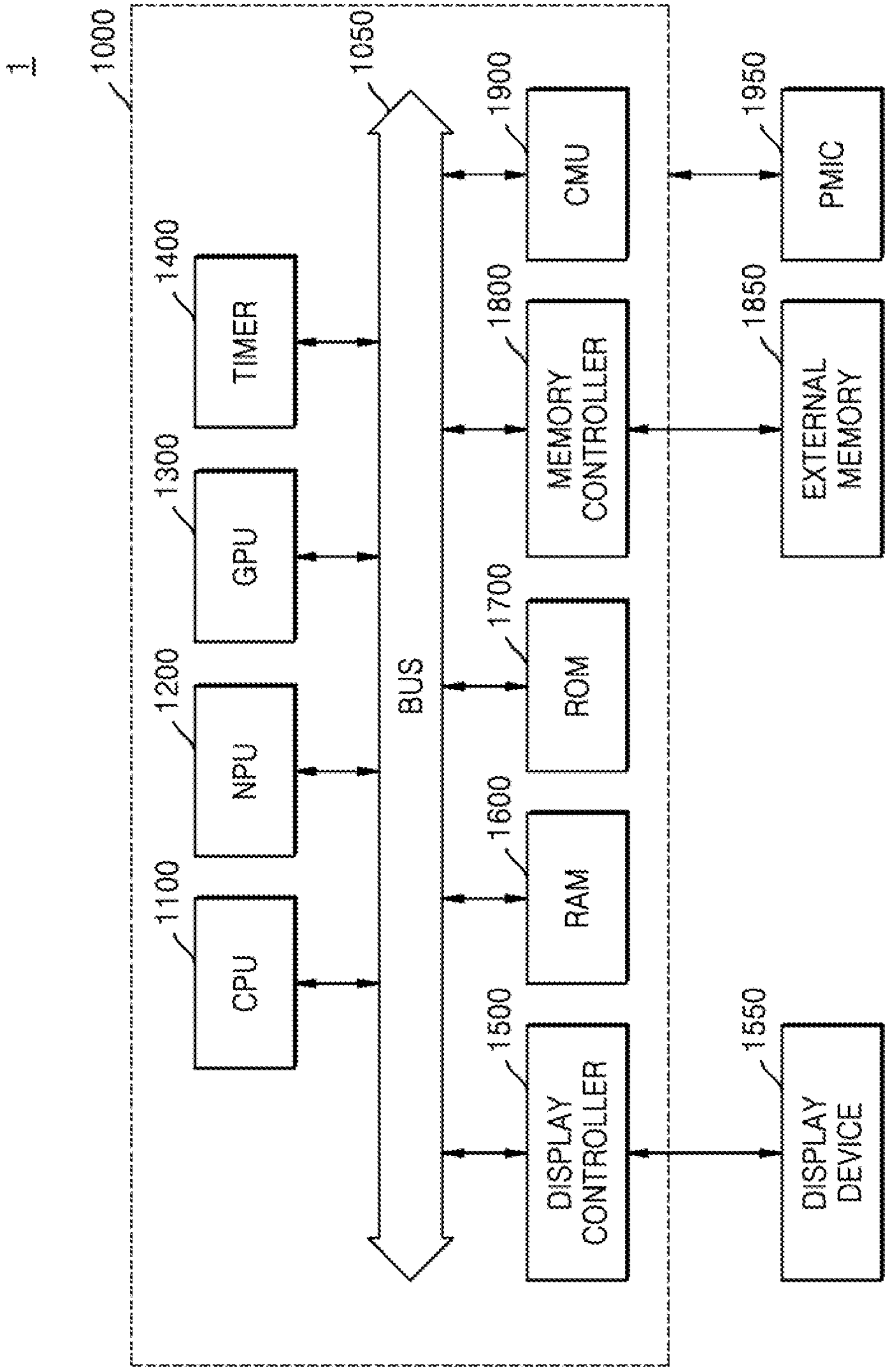
FIG. 10 is a block diagram of an electronic device according to an embodiment.

FIG. 10 is a block diagram of an electronic device 1 according to an embodiment.

Referring to FIG. 10, the electronic device 1 may be implemented by a handheld device such as a mobile phone, a smartphone, a tablet personal computer (PC), a personal digital assistant (PDA), an enterprise digital assistant (EDA), a digital still camera, a digital video camera, a portable multimedia player (PMP), a personal navigation device or portable navigation device (PND), a handheld game console, or an e-book.

The electronic device 1 may include an SoC 1000, an external memory 1850, a display device 1550, and a power management integrated circuit (PMIC) 1950.

The SoC 1000 may include a central processing unit (CPU) 1100, a neural processing unit (NPU) 1200, a graphics processing unit (GPU) 1300, a timer 1400, a display controller 1500, random access memory (RAM), read-only memory (ROM) 1700, a memory controller 1800, a clock management unit (CMU) 1900, and a bus 1050. The SoC 1000 may further include other components in addition to the shown components. For example, the electronic device 1 may further include the display device 1550, the external memory 1850, and the PMIC 1950. The PMIC 1950 may be implemented outside the SoC 1000. However, the disclosure is not limited thereto, and the SoC 1000 may include a power management unit (PMU) capable of performing a function of the PMIC 1950.

The CPU 1100 may be referred to as a processor and process or execute programs and/or data stored in the external memory 1850. For example, the CPU 1100 may process or execute programs and/or data in response to an operating clock signal output from the CMU 1900.

The CPU 1100 may be implemented by a multi-core processor. The multi-core processor is a single computing component having two or more independent substantial processors (referred to as cores), and each of the processors may read and execute program instructions. Programs and/or data stored in the ROM 1700, the RAM 1600, and/or the external memory 1850 may be loaded in a memory of the CPU 1100 according to circumstances.

The NPU 1200 may efficiently process a large scale of computation by using an artificial neural network. The NPU 1200 may perform deep learning by supporting multiple matrix computations at the same time.

The GPU 1300 may convert data read from the external memory 1850 by the memory controller 1800 into a signal suitable for the display device 1550.

The timer 1400 may output a count value indicating a time based on the operating clock signal output from the CMU 1900.

The display device 1550 may display images corresponding to image signals output from the display controller 1500. For example, the display device 1550 may be implemented by a liquid crystal display (LCD), a light-emitting diode (LED) display, an organic LED (OLED) display, an active-matrix OLED (AMOLED) display, or a flexible display. The display controller 1500 may control an operation of the display device 1550.

The RAM 1600 may temporarily store programs, data, or instructions. For example, programs and/or data stored in the external memory 1850 may be temporarily stored in the RAM 1600 under control of the CPU 1100 or according to booting code stored in the ROM 1700. The RAM 1600 may be implemented by dynamic RAM (DRAM) or static RAM (SRAM).

The ROM 1700 may store permanent programs and/or data. The ROM 1700 may be implemented by erasable programmable read-only memory (EPROM) or electrically erasable programmable read-only memory (EEPROM).

The memory controller 1800 may communicate with the external memory 1850 through an interface. The memory controller 1800 generally controls an operation of the external memory 1850 and controls a data exchange between a host and the external memory 1850. For example, the memory controller 1800 may write data on the external memory 1850 or read data from the external memory 1850, according to a request of the host. Herein, the host may be a master device such as the CPU 1100, the GPU 1300, or the display controller 1500.

The external memory 1850 is a storage medium storing data and may store an operating system (OS), various kinds of programs, and/or various kinds of data. The external memory 1850 may be, for example, the DRAM 1600 but is not limited thereto. For example, the external memory 1850 may be a non-volatile memory device (e.g., a flash memory, phase change RAM (PRAM), magnetic RAM (MRAM), resistive RAM (RRAM), or ferroelectric RAM (FeRAM) device). In an embodiment, the external memory 1850 may be an embedded memory provided inside the SoC 1000. In addition, the external memory 1850 may be flash memory, an embedded multimedia card (eMMC), or a universal flash storage (UFS).

The CMU 1900 generates the operating clock signal. The CMU 1900 may include a clock signal generation device such as a phase-locked loop (PLL), a delay-locked loop (DLL), or a crystal oscillator.

The operating clock signal may be provided to the GPU 1300. The operating clock signal may be provided to another component (e.g., the CPU 1100 or the memory controller 1800). The CMU 1900 may change a frequency of the operating clock signal.

The CPU 1100, the NPU 1200, the GPU 1300, the timer 1400, the display controller 1500, the RAM 1600, the ROM 1700, the memory controller 1800, and the CMU 1900 may communicate with each other through the bus 1050.

Figure 11:
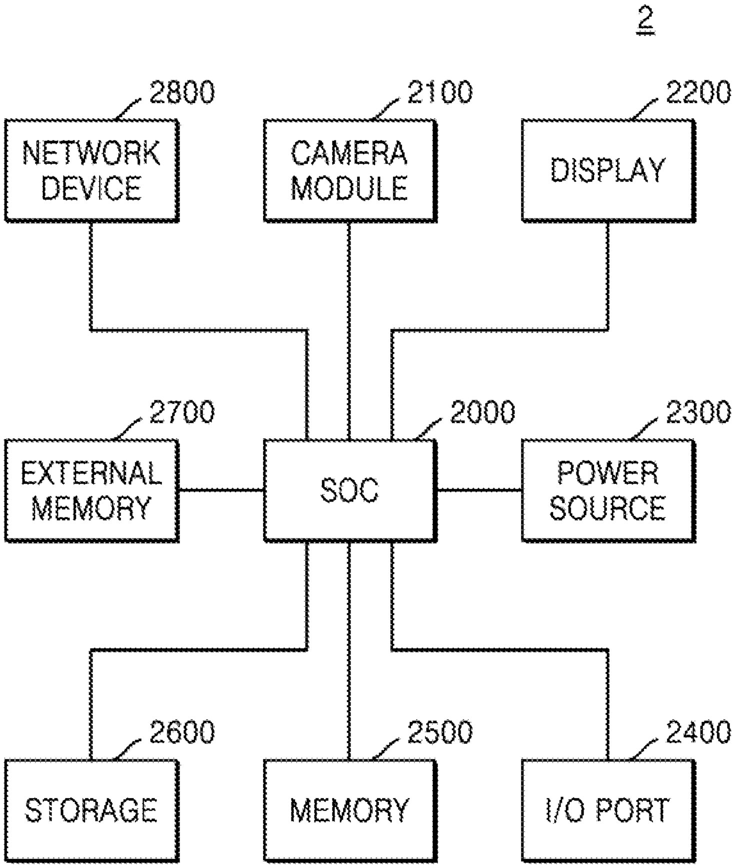
FIG. 11 is a block diagram of an electronic device according to an embodiment.

FIG. 11 is a block diagram of an electronic device 2 according to an embodiment.

Referring to FIG. 11, the electronic device 2 may be implemented by a PC, a data server, or a handheld electronic device.

The electronic device 2 may include an SoC 2000, a camera module 2100, a display 2200, a power source 2300, an input/output port 2400, a memory 2500, a storage 2600, an external memory 2700, and a network device 2800.

The camera module 2100 indicates a module capable of converting an optical image into an electrical image. Therefore, the electrical image output from the camera module 2100 may be stored in the storage 2600, the memory 2500, or the external memory 2700. In addition, the electrical image output from the camera module 2100 may be displayed on the display 2200.

The display 2200 may display data output from the storage 2600, the memory 2500, the input/output port 2400, the external memory 2700, or the network device 2800. The display 2200 may be the display device 1550 shown in FIG. 10.

The power source 2300 may supply an operating voltage to at least one of the components. The power source 2300 may be controlled by the PMIC 1950 shown in FIG. 10.

The input/output port 2400 indicates ports through which data is transmitted to the electronic device 2 or through which data output from the electronic device 2 is transmitted to an external device. For example, the input/output port 2400 may be a port configured to connect a pointing device such as a mouse, a port configured to connect a printer, or a port configured to connect a universal serial bus (USB) drive.

The memory 2500 may be implemented by a volatile memory or a nonvolatile memory. According to an embodiment, a memory controller capable of controlling a data access operation, e.g., a read operation, a write operation (or a program operation), or an erase operation, to the memory 2500 may be integrated or embedded in the SoC 2000. According to an embodiment, the memory controller may be implemented between the SoC 2000 and the memory 2500.

The storage 2600 may be implemented by a hard disk drive or a solid state drive (SSD).

The external memory 2700 may be implemented by a secure digital (SD) card or a multimedia card (MMC). According to an embodiment, the external memory 2700 may be a subscriber identification module (SIM) card or a universal subscriber identity module (USIM) card.

The network device 2800 indicates a device capable of connecting the electronic device 2 to a wired network or a wireless network.

While the disclosure has been particularly shown and described with reference to embodiments thereof, it will be understood that various changes in form and details may be made therein without departing from the spirit and scope of the following claims.

What is claimed is:

1. A system on chip (SoC) for receiving an external supply voltage, the SoC comprising:

a core having a clock gating state in which supplying a clock signal is suspended; and a power manager comprising a plurality of header switch circuits configured to generate a supply voltage based on the external supply voltage and provide the supply voltage to the core, wherein a first header switch circuit of the plurality of header switch circuits comprises a first number of header switches, and a second header switch circuit of the plurality of header switch circuits comprises a second number of header switches different from the first number, wherein the power manager is further configured to increase the supply voltage every time the supply voltage provided to the core having the clock gating state is lower than a target voltage for maintaining the clock gating state, and wherein the target voltage is lower than the external supply voltage.

2. The SoC of claim 1, wherein the power manager is further configured to determine an increased amount of the supply voltage provided to the core having the clock gating state, according to a difference between the target voltage and the supply voltage.

3. The SoC of claim 1, wherein the plurality of header switch circuits are configured to deliver, as the supply voltage, a voltage reduced from the external supply voltage to the core in response to a plurality of control signals, and wherein the power manager comprises a voltage regulator configured to change respective logic levels of the plurality of control signals according to a difference level equal to a difference between the supply voltage and the target voltage.

4. The SoC of claim 3, wherein each of the plurality of header switch circuits comprises a different number of header switches from each other of the plurality of header switch circuits.

5. The SoC of claim 4, wherein the plurality of control signals comprise first to kth control signals (k is an integer greater than or equal to 2), wherein the plurality of header switch circuits comprise first to kth header switch circuits, and wherein for each integer r greater than or equal to 2 and less than or equal to k, a number of header switches included in an rth header switch circuit among the first to kth header switch circuits is double a number of header switches included in an (r−1)th header switch circuit.

6. A system on chip (SoC) comprising:

a core; and a plurality of header switch circuits configured to supply a supply voltage to the core, wherein each of the plurality of header switch circuits is turned on or off based on a detected supply voltage supplied to the core, and wherein a first header switch circuit of the plurality of header switch circuits comprises a first number of header switches, and a second header switch circuit of the plurality of header switch circuits comprises a second number of header switches different from the first number.

7. The SoC of claim 6, wherein each of the plurality of header switch circuits is turned on or off based on a difference between a target supply voltage and the detected supply voltage supplied to the core.

8. The SoC of claim 7, wherein the target supply voltage is lower than an external supply voltage supplied to the SoC.

9. The SoC of claim 7, wherein for each integer k greater than or equal to 2, a kth header switch circuit of the plurality of header switch circuits comprises a kth number of header switches that is double a (k−1)th number of header switches.

10. The SoC of claim 7, wherein the SoC is configured to provide a control signal to the plurality of header switch circuits for turning on and off of each of the plurality of header switch circuits, and wherein each bit of the control signal corresponds to a respective header switch circuit of the plurality of header switch circuits.

11. A system on chip (SoC) comprising:

a plurality of cores;

a plurality of header switch groups each including a plurality of header switch circuits, the plurality of header switch groups configured to supply a supply voltage to the plurality of cores based on a plurality of control signals; and a voltage regulator configured to monitor the supply voltage supplied to the plurality of cores, and output the plurality of control signals to the plurality of header switch groups based on a difference level equal to a difference between the supply voltage and a target voltage, wherein the plurality of header switch groups comprises a first header switch group, a first header switch circuit of the first header switch group comprises a first number of header switches, and a second header switch circuit of the first header switch group comprises a second number of header switches different from the first number.

12. The SoC of claim 11, wherein the plurality of cores include a first core, and a second core, wherein the first header switch group is configured to supply a first supply voltage to the first core, wherein the plurality of header switch groups further include a second header switch group configured to supply a second supply voltage to the second core, and wherein the voltage regulator comprises a first low drop-out (LDO) configured to output a plurality of first control signals for respectively turning on and off of the plurality of header switch circuits included in the first header switch group, and a second LDO configured to output a plurality of second control signals for respectively turning on and off of the plurality of header switch circuits included in the second header switch group.

13. The SoC of claim 12, wherein the first LDO is further configured to supply a first compensation supply voltage to the first core, based on a first difference level between the first supply voltage and a first target voltage, and wherein the second LDO is further configured to supply a second compensation supply voltage to the second core, based on a second difference level between the second supply voltage and a second target voltage.

14. The SoC of claim 12, wherein for each integer k greater than or equal to 2, a kth header switch circuit of the plurality of header switch circuits comprises a kth number of header switches that is double a (k−1)th number of header switches.

15. The SoC of claim 14, wherein a plurality of bits corresponding to the plurality of first control signals correspond to the plurality of header switch circuits included in the first header switch group respectively, and the first LDO is configured to change at least one bit among first to (k−1)th bits of corresponding to the plurality of first control signals, based on a first difference level between the first supply voltage and a first target voltage, and wherein a plurality of bits corresponding to the plurality of second control signals correspond to the plurality of header switch circuits included in the second header switch group respectively, and the second LDO is configured to change at least one bit among first to (k−1)th bits of corresponding to the plurality of second control signals, based on a second difference level between the second supply voltage and a second target voltage.

16. The SoC of claim 15, wherein the first LDO is configured to generate bitwise data based on a first quotient obtained by dividing the first difference level by a first preset unit voltage level, and change the at least one bit among the first to (k−1)th bits of corresponding to the plurality of first control signals according to bit values of the first quotient, and wherein the second LDO is configured to generate bitwise data based on a second quotient obtained by dividing the second difference level by a second preset unit voltage level, and change the at least one bit among the first to (k−1)th bits of corresponding to the plurality of second control signals according to bit values of the second quotient.

17. The SoC of claim 11, wherein the plurality of header switch groups include the first header switch group, a second header switch group, and a third header switch group, wherein the first header switch group, the second header switch group, and the third header switch group are arranged in parallel to each other in a same direction in which a plurality of power lines are arranged in parallel to each other, and include a plurality of header switches, and wherein the plurality of header switches each included in the first header switch group, the second header switch group, and the third header switch group are arranged zigzag in a direction orthogonal to the same direction.

18. The SoC of claim 17, wherein the plurality of header switches each included in the first header switch group and the third header switch group are connected to each other in a daisy chain, wherein the second header switch group includes first to fifteenth header switches, wherein an eighth header switch of the second header switch group is connected to a wire through which a first control signal is input and is connected to a different wire through which the input first control signal is output, wherein fourth and twelfth header switches of the second header switch group are connected to a wire through which a second control signal is input, and are connected to a different wire through which the input second control signal is output, wherein second, sixth, tenth, and fourteenth header switches are connected to a wire through which a third control signal is input, and are connected to a different wire through which the input third control signal is output, and wherein first, third, fifth, seventh, ninth, eleventh, thirteenth, and fifteenth header switches are connected to a wire through which a fourth control signal is input, and are connected to a different wire through which the input fourth control signal is output.

19. The SoC of claim 11, wherein, when at least one core among the plurality of cores has a clock gating state in which supplying a clock signal is suspended, a supply voltage supplied to the at least one core having the clock gating state is lower than a supply voltage supplied to a core having the highest performance among the plurality of cores.

20. The SoC of claim 19, wherein the plurality of cores include a first core configured to receive a first clock signal, a second core configured to receive a second clock signal having a frequency lower than a frequency of the first clock signal, and a third core configured to receive a third clock signal having a frequency lower than the frequency of the second clock signal.

* * * * *